United States Patent [19]

Goldie

[11] 4,170,007
[45] Oct. 2, 1979

[54] ADDING FREQUENCY AGILITY TO FIRE-CONTROL RADARS

[75] Inventor: Harry Goldie, Randallstown, Md.

[73] Assignee: The United States of America as represented by the Secretary of the Air Force, Washington, D.C.

[21] Appl. No.: 871,067

[22] Filed: Jan. 20, 1978

[51] Int. Cl.² ............................................. G01S 9/02
[52] U.S. Cl. ...................................................... 343/5 R
[58] Field of Search ........................................ 343/5 R

[56] References Cited

U.S. PATENT DOCUMENTS

| | | | |
|---|---|---|---|
| 3,233,212 | 2/1966 | Auer, Jr. et al. | 343/5 R X |
| 3,403,394 | 9/1968 | Rouault | 343/5 R |
| 3,648,197 | 3/1972 | Siekanowicz | 333/24.1 X |
| 3,688,207 | 8/1972 | Morris | 343/5 R X |
| 4,023,169 | 5/1977 | Kolp et al. | 343/17.2 R |
| 4,038,659 | 7/1977 | Hamer et al. | 343/5 R X |
| 4,044,318 | 8/1977 | Daly et al. | 343/16 M |

OTHER PUBLICATIONS

"Wide Band Amplifier Tracks Signals in Dense Electromagnetic Environment", Microwaves, Nov. 1969, pp. 67-68.

Primary Examiner—Malcolm F. Hubler
Attorney, Agent, or Firm—Joseph E. Rusz; Robert Kern Duncan

[57] ABSTRACT

Frequency agility may be added to fire control radars by replacing the conventional receiver-protector/stationary-filter combination located between the duplexing circulator and the receiver input with a passive high power ferrite limiter and YIG tracking filter combination.

1 Claim, 4 Drawing Figures

4,170,007

ADDING FREQUENCY AGILITY TO FIRE-CONTROL RADARS

RIGHTS OF THE GOVERNMENT

The invention described herein may be manufactured or used by or for the government of the United States for all governmental purposes without the payment of any royalty.

BACKGROUND OF THE INVENTION

The field of the invention is in the radar art and more particularly in the art of fire-control radars having active missile guidance.

Modern state-of-the-art fire-control radars with active missile guidance cw beams use a stationary filter in front of a receiver-protector to prevent the transmitter leakage from saturating the receiver and from keeping the receiver protector "on" continuously. The stationary filter parameters place certain bounds on the missile guidance frequency that precludes the use of frequency agility.

The following patents are of general interest in the background of the invention and the best know prior art. U.S. Pat. Nos. 3,027,525 issued to patentee E. Salzberg; 3,289,112 issued to patentee C. E. Brown; 3,426,299 issued to patentee S. Dixon, Jr.; 3,648,197 issued to patentee W. Siekanowicz; and 4,023,169 issued to patentee E. Kolp et al. Pending patent application Ser. No. 854,449 dated Nov. 23, 1977 by H. Goldie et al entitled "Microwave YIG Power Limiter Using Electrically Thin Iris," also discloses a passive ferrite power limiter that is suitable for use in the combination comprising the present invention.

SUMMARY OF THE INVENTION

The invention is an electronic system that is connected between the duplexing circulator and the radar receiver in fire-control radar systems that substantially stops a cw (or pulsed) microwave frequency radar signal used for active missile guidance from entering the receiver while allowing frequency agility of not only the missile guidance frequency but also the radar search and track frequency.

DESCRIPTION OF THE PREFERRED EMBODIMENT

Figure 1:
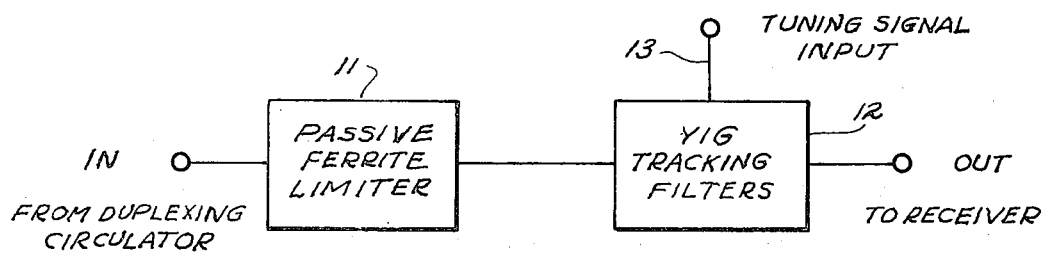
FIG. 1 illustrates in block diagram form an embodiment of the invention.

The circuit as illustrated in FIG. 1, in the radar transmit mode, provides continuous rejection of the pulsed (or cw) missile guidance frequency (fg) and continuous rejection of the search-and-track frequency (fs) echoes when their respective power level is above the threshold of the limiter 11. The frequency-selective, passive, YIG power limiter 11, typically, selectively limits all signals within its stopband from +50 dBm down to +7 dBm. The cascaded YIG tracking filter 12 is synchronously driven with the missile frequency fg by the input tuning signal 13 and typically provides 130 dB further rejection so that the +7 dBm output leakag of fg from limiter 11 is suppressed to −123 dBm (at the receiver noise threshold). fs (returns from strong echoes) need only be suppressed to the level at which the low noise receiver is not permanently degraded. This is because the receiver is off during the intrapulse period, i.e., during the main bang or high power search and track burst, and any excess leakage reaching the receiver is not amplified and does not reach the signal processing circuits.

Figure 2A:
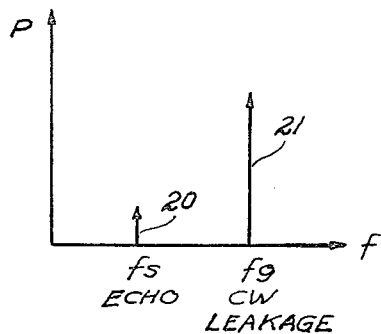
FIG. 2a graphically illustrates a typical echo signal and the cw leakage signal at the output of the duplexing circulator going toward the receiver.
Figure 2B:
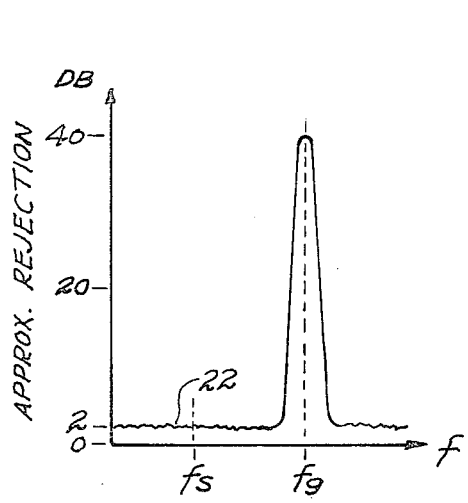
FIG. 2b graphically illustrates the rejection characteristics of a typical ferrite passive power limiter.
Figure 2C:
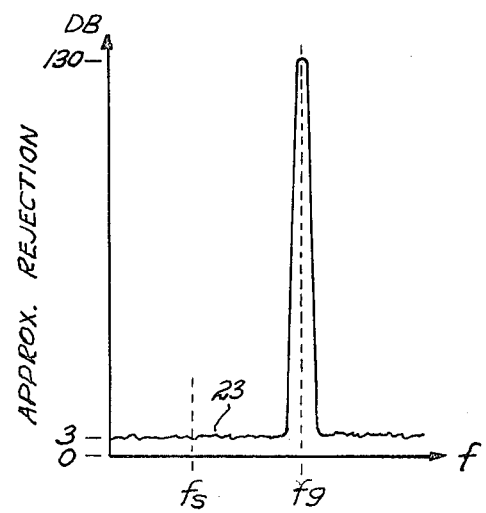
FIG. 2c graphically illustrates the rejection characteristics of a typical cascaded two YIG frequency limiter tracking filter.

In the radar receive mode the signals going toward the receiver from the output of the duplexing circulator are typically represented in the graph shown in FIG. 2a. Line 20 represents the power contained in an echo signal fs at the frequency fs. Line 21 represents the signal leakage of the transmitted signal coming from the duplexing circulator, at frequency fg. On receive, fg is rejected by the combination of the passive limiter 11, having typical rejection characteristics as illustrated in FIG. 2b, and the active tracking filter 12, having the rejection characteristics as typically illustrated in FIG. 2c, the same as during transmit, however the sharp (approximately 10 MHz) selectively of the limiter-filter combination allows the weak target echoes to pass from the antenna to the receiver with low attenuation. It is to be noted that in typical prior art systems the approximate echo signal (low level) attenuation going through a stationary filter and receiver-protector combination is approximately 2 dB. In the invention, as is illustrated by curves 22 and 23 of FIGS. 2b and 2c, typically, the low level attenuation for the passive limiter at frequency fs (curve 22) is approximately 2 dB, and the attenuation through the cascaded filters at frequency fs (curve 23) is typically approximately 3 dB. The total low level attenuation for the system of the invention is thus approximately 5 dB, 3 dB greater than typical prior art systems, but with frequency agility which the prior art systems could not satisfactorily perform.

The following table sets forth typical operating characteristics of an embodiment of the invention using presently available state-of-the-art frequency selective YIG limiters and YIG tracking filters (two cascaded 65 dB/2 dB conventional filters).

| Parameter | Freq-Selective YIG Limiters | Commercial YIG Tracking Filters |
|---|---|---|
| Average power handling capability (watts) | 30 | 0.01 |
| Dynamic Range (dB) | 43 | 130 |
| Below Threshold signal Loss (dB) | 1.7 | 4 |
| Frequency Selectivity at highest operating RF Power Level (MHz) | 20 | 20 |
| Threshold/Output (dBm) | 7 | −123 |

I claim:

1. A system to provide frequency agility to fire control radars having a duplexing circulator providing an output signal connection, a missile guidance rf frequency signal, and a receiver having an input connection, the said system comprising:

a. a passive ferrite frequency-selection YIG limiter connected to the said output of the duplexing circulator and providing an output signal; and b. a YIG rejection tracking filter having an input connection connected to the said output of the passive ferrite limiter, a tuning control input signal connection connected to the said missile guidance rf frequency signal for synchronously tuning the said tracking filter to the said missile guidance rf frequency, and an output signal connection connected to the said receiver input connection.

* * * * *